MEANS FOR DETECTING PRESENCE AND MOVEMENT OF BODIES

Original Filed Oct. 7, 1944 2 Sheets-Sheet 1

INVENTOR.
John L. Barker
BY
Duell, Rose & Smart
ATTORNEYS

MEANS FOR DETECTING PRESENCE AND MOVEMENT OF BODIES
Original Filed Oct. 7, 1944 2 Sheets-Sheet 2
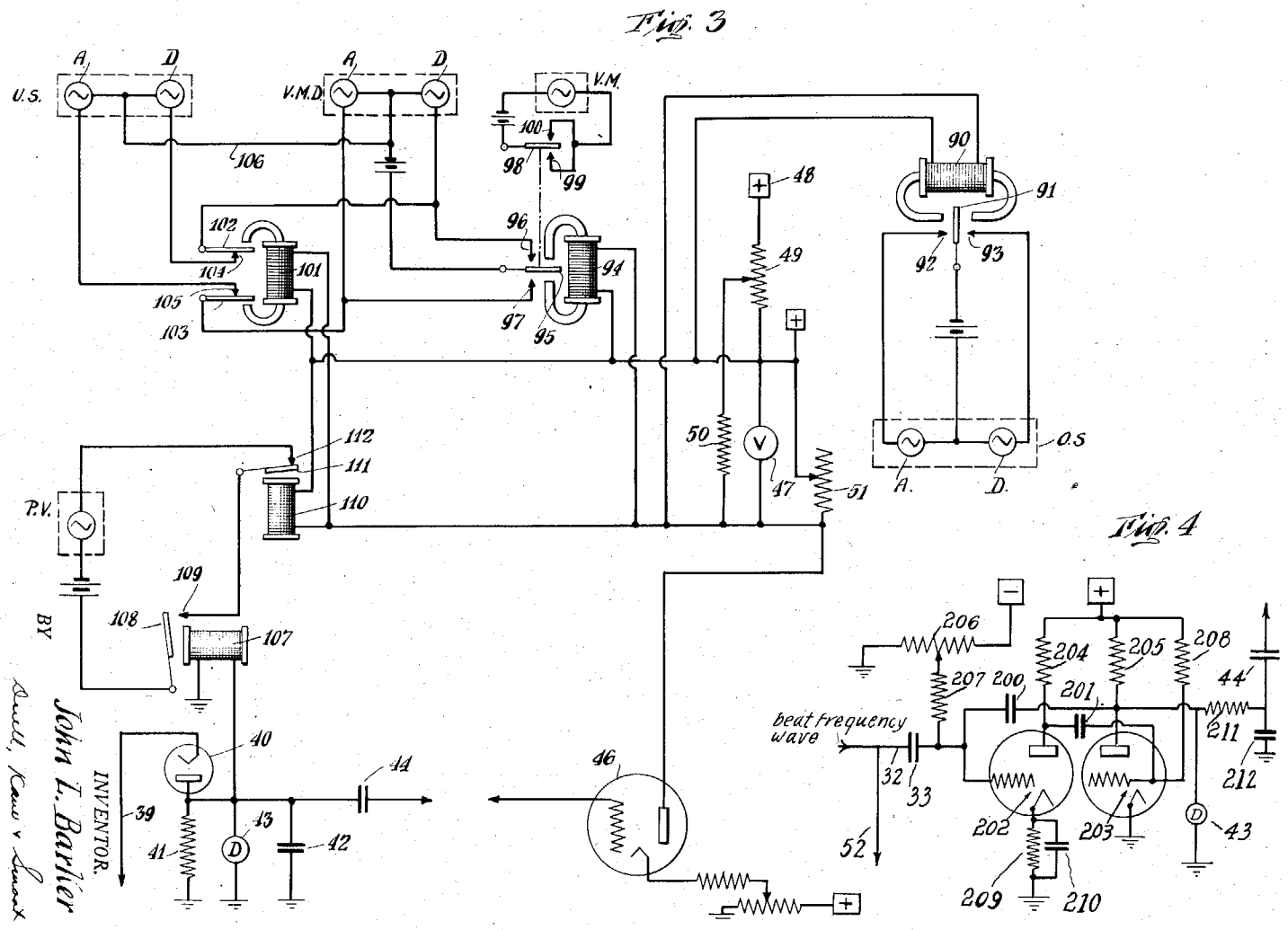
INVENTOR.
John L. Barker
BY
Quill, Kane & Smart
ATTORNEYS Reissued Sept. 4, 1951 Re. 23,403

UNITED STATES PATENT OFFICE 23,403

MEANS FOR DETECTING PRESENCE AND MOVEMENT OF BODIES

John L. Barker, Norwalk, Conn., assignor to Eastern Industries, Incorporated, a corporation of Delaware Original No. 2,477,567, dated August 2, 1949, Serial No. 557,578, October 7, 1944. Application for reissue August 2, 1950, Serial No. 177,325

26 Claims. (Cl. 343—9)

Matter enclosed in heavy brackets [ ] appears in the original patent but forms no part of this reissue specification; matter printed in italics indicates the additions made by reissue.

This invention relates to means for determining the speed, direction, or speed and direction of travel of vehicles along a traffic lane or track.

Embodiments of the invention may be used for determining the direction of travel and speed of travel of any vehicle having surfaces capable of reflecting ultra high frequency or hyper frequency electromagnetic waves. In the description that follows, the invention will be explained with respect to its function as a speed and direction analyzing device for automotive traffic.

A number of contemporary systems provide for determining speed and direction of vehicular traffic by establishing suitably spaced stations equipped with devices for creating an electric impulse as vehicles pass by. Electrical circuits of the respective stations may be correlated in suitable apparatus to determine the time between successive impulses and thereby the speed of transit, the spacing between successive stations being known.

Such systems have utilized devices such as contactors or other switch means in the road bed for actuation by the passage of vehicles thereover, or such means as photoelectric cells or other non-mechanical apparatus by which an electric impulse is created by the passage of the vehicle through or within the zone of effectiveness of such apparatus. These prior art systems usually require direct electrical connections from the detection or impulse creating stations to the control apparatus. Direct electrical connections are costly to install and to maintain, and such apparatus as additionally requires excavation of the road bed is a hazard during installation and during such times as the cable or other plant must be repaired or replaced because of electrical failure.

Broadly speaking, the present invention provides for transmititng along a traffic lane or lanes an ultra high frequency of hyper frequency electromagnetic or radio wave, and means for utilizing the reflection of the wave or a portion thereof from a vehicle to detect the presence and movement of the vehicle, and to analyze its speed and direction of travel.

It is known that ultra high frequency or hyper frequency waves may be directed in a relatively narrow beam, and will be reflected from surfaces against which the waves impinge. By comparing the time interval between the transmission of a wave and the reception of a reflected wave, the distance of the reflecting object from the transmitter and receiver unit, assuming negligible distance between the transmitter and receiver, may be determined. The time interval may be expressed, so to speak, in terms of "beat frequency," the magnitude of which is a function of distance of the reflecting surface from the transmitter-receiver. The beat frequency, resulting from beating the reflected wave against the transmitted wave, decreases as the distance decreases, and vice versa; and by analyzing the rate of change of freqeuncy, the speed of approach or departure of the vehicle may be ascertained.

An efficient means of operation is by transmitting a frequency modulated ultra high frequency wave and beating the received reflected wave against the transmitted wave, suitably amplifying the output from the transmitter-receiver, and conducting said amplified output to a "zone selector" comprising a circuit tuned to a predetermined beat frequency or beat frequency range. Assuming a beat frequency characteristic of a distance, for example, of 300' from the reflecting object to the transmitter-receiver station, operation of a relay or meter in the output circuit of the zone selector would indicate the presence of a vehicle at that distance. As the vehicle approaches the transmitter-receiver, the beat frequency decreases; and by a suitable resistance-capacitor network, the rate of frequency change within the range of the zone selector may be translated to voltage which is a function of velocity, i. e., speed, of the vehicle.

In short, a voltage impulse is generated as a vehicle enters the zone defined by a tuned frequency circuit. The impulse is evaluated for direction of vehicular travel and for the speed thereof in such direction.

Subject matter relating to detection at a particular distance or in a zone corresponding to a particular range of distance per se is disclosed and claimed in my copending application Serial Number 535,937, filed May 17, 1944, *which issued February 6, 1951, as U. S. Patent No. 2,540,089.*

It will be apparent that rate of increase of the beat frequency indicates departure of the vehicle from the transmitter-receiver unit, and the speed of the departure of the vehicle may be similarly analyzed.

It has been found that there is a sharp—and substantially immediately subsiding—peak of voltage generation at the instant the vehicle enters the detection zone, and as it leaves the zone. Such peak manifestations will produce false meter readings or would improperly actuate automatic signalling devices. It is a feature of the present invention that such peaks are cancelled out, and that the apparatus is at voltage level of operation immediately thereafter.

The speed of the vehicle may be indicated on a voltmeter calibrated in units of speed, or in other visual or audible signals which indicate speed above or below a desired norm. For example, the invention may actuate signals warning a driver to slacken his excess speed, or to accelerate to a speed level above an unsafe low speed, as is frequently desired along express highways.

Another important function of the invention is in connection with vehicle actuated traffic control systems in which right of way is allocated to a traffic lane according to the vehicular activity thereon. In such systems, it is usual to hold right of way on a traffic lane beyond a preestablished limit of time if the detection-apparatus detects an approaching vehicle. How much additional time must be accorded the right of way to accommodate the approaching vehicle depends, obviously, upon its speed of approach. When, on a green light, a vehicle is approaching the traffic signal at a certain rate of speed, it is a reasonable assumption that the vehicle will maintain its speed, and the number of seconds between its detection at a certain distance from the signal and its passage through the signal is readily mechanically evaluated, and the right of way extended accordingly.

It is therefore an object of the invention to provide improved means for quickly determining the speed of travel of a vehicle as it proceeds through an area or zone on a highway or other traffic path.

It is another object of the invention to provide improved means for the automatic determination of direction of movement of a vehicle through or along a traffic path.

It is another object of the invention to provide means whereby indicating or signalling apparatus may be automatically actuated according to the speed of a vehicle in approaching or departing from a control point.

It is still another object of the invention to provide means for quickly determining the speed of a vehicle while at a relatively great distance from a traffic control or detection station.

It is an additional object of the invention to provide means which may be employed in conjunction with traffic-actuated apparatus for allocating right of way along traffic lanes, to determine the time in which a vehicle, the presence of which has been detected at a certain distance from the traffic control point, may be expected to reach said control point.

It is still another object of the invention to provide means whereby the speed of a vehicle relative to a control point may be converted to a voltage which is a function of such speed, and the voltage utilized to actuate signal or control apparatus.

It is another object of the invention to provide improved means for detecting the location of a vehicle relative to a control point, and its speed and direction of travel, by the employment of ultra high frequency or hyper frequency radio waves.

It is an object of the invention to provide means for determining the speed of a vehicle by transmitting an ultra high frequency radio wave in the direction of the vehicle, beating against said transmitted wave a wave reflected from the vehicle to obtain a beat frequency, and utilizing the rate of change of such beat frequency to derive a resultant voltage which is characteristic of speed.

An embodiment of the invention will now be described with reference to the several figures of drawings as follows:

Fig. 3 is a schematic representation of relays which may be employed in the invention for actuating traffic control apparatus, direction-of-movement indicators, speed indicators, vehicle-presence indicators, and the like; and Fig. 4 is a circuit diagram for another means of deriving voltage proportional to frequency, employing an unbalanced multivibrator circuit.

Figures 1, 2:
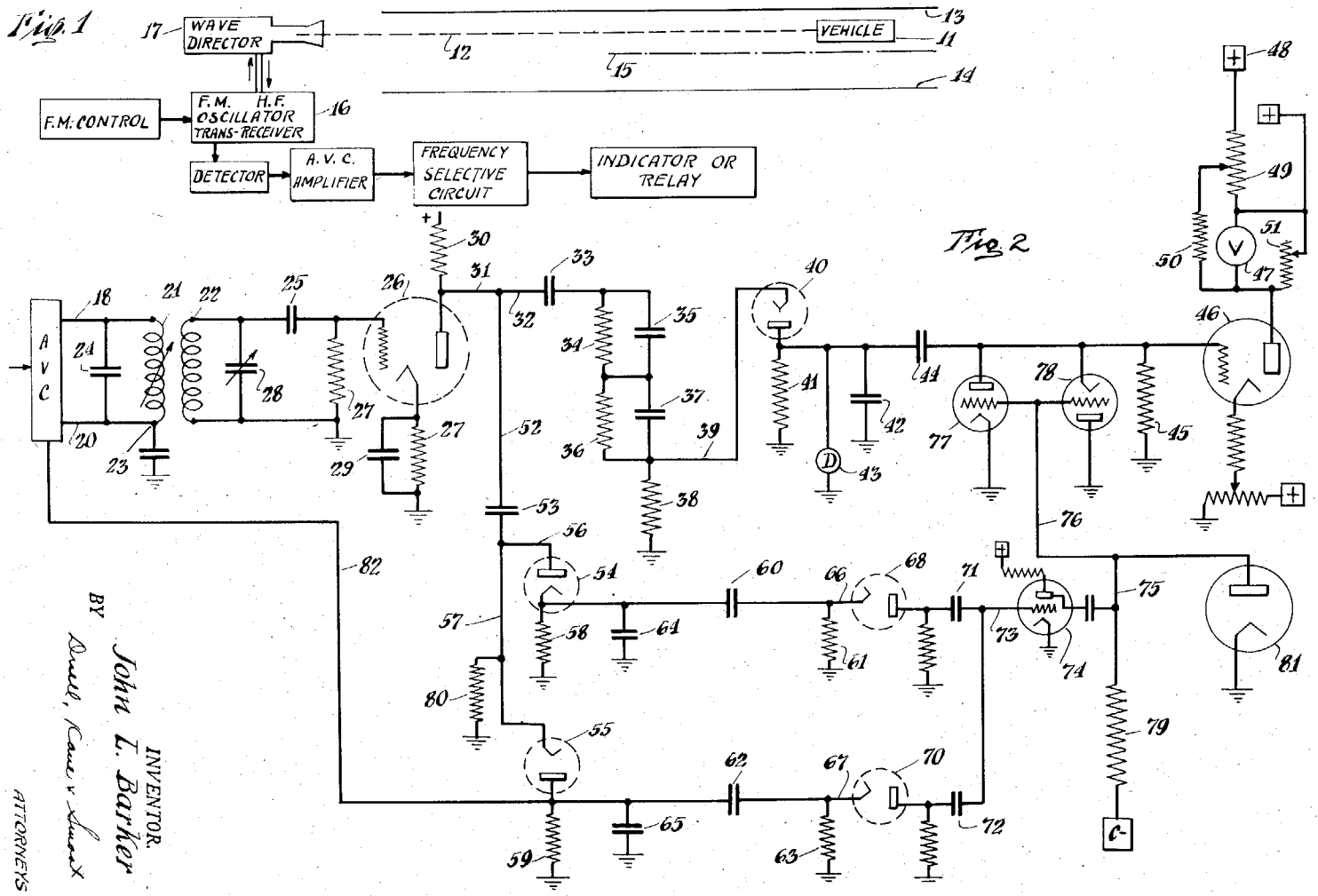
Fig. 1 shows schematically a wave director unit for directing ultra-high frequency or hyper frequency radio waves along a traffic lane toward an approaching vehicle with a block diagram of the other major elements of a preferred embodiment of the apparatus.
Fig. 2 is a circuit diagram of the indicator or relay circuit, and showing one means of deriving voltage proportional to speed.

Referring now to Fig. 1, a vehicle 11 is illustrated travelling along a traffic lane 12 toward the left. This vehicle may be an automobile or other ordinary traffic element moving along a road or highway, and it will be assumed it is travelling along a lane or pathway near or approaching a control point from which it is desired to detect the presence and speed of the vehicle.

The lane for convenience is identified at one side of a roadway or other traffic path for two way traffic for example. The two edges of the roadway are shown by the lines 13 and 14 and the center line 15 of the roadway is shown as a broken line. It is assumed that the traffic lane in which it is desired to detect vehicles is between the edge 13 and the center line 15.

The vehicle may be detected for purpose of traffic control at an intersection of traffic lanes, for indicating or signalling the speed of the vehicle, for making a count or record of the number of vehicles passing within a time period, or for other purposes usual in traffic analysis or control systems.

It will be understood that the detection zone may comprehend the entire roadway, or duplicate apparatus may be employed for the respective approaching and departing traffic lanes.

In general, in accordance with the invention, it is desired to determine the speed of a vehicle at some distance, or within some length of the traffic lane, which may be called a zone. In the case of street or highway traffic it may be desired in some cases to detect vehicles, and evaluate their speed, approaching at a distance of 500 feet from a traffic intersection, or over a zone extending from 500 to 550 feet from the intersection. In other cases, the detection zones may be more advantageously located at other distances from the traffic intersection or control point.

At or near the intersection or other control point a transmitter and receiver unit 16 is located for generating and receiving hyper frequency electromagnetic or radio waves of a suitable frequency. A director 17 for these waves is arranged to direct the waves along the traffic lane in a relatively narrow beam toward the approaching vehicle 11.

Fig. 1 is purely schematic, as respects the representation and location of the transmitter-receiver unit. It will be understood that this unit may be located at one side of the traffic lane with the transmitter unit separated from the receiver unit if desired. Also, the director 17 may be a parabolic reflector, directional antenna array, exponential horn, or the like.

The hyper frequency oscillator and receiver and antenna therefor may be located in a housing on or integral with a pole and the hyper frequency waves transmitted and directed by means of a wave-guide up the pole and pointed along the traffic line, or the oscillator-receiver and the wave-guide director may be closely coupled and placed in one unit on the pole or supported over the traffic lane.

By means of wave director 17, the hyper-frequency waves are directed along the traffic lane in a substantially straight line on a narrow beam. The waves are reflected to a considerable extent from a vehicle in the line of direction of the waves and a portion of reflected waves is received back at the wave director.

Considering briefly at first the block diagram of the apparatus in Fig. 1, hyper-frequency electric wave energy is generated in the oscillator designated "F. M. H. F. oscillator trans.-receiver." The basic hyper-frequency waves are frequency-modulated by the "F. M. control," and the frequency modulated waves are transmitted to the "Wave director" over coaxial cable or a wave guide. In the present instance it will be assumed that the F. M. waves are transmitted as electric currents over a coaxial cable into the "Wave director" where a miniature antenna transmits the electric current energy as hyper-frequency electromagnetic waves. These waves are directed by suitable means along the traffic lane.

Waves reflected back from a vehicle return to the wave director, and a part of the reflected wave energy is picked up by the antenna and transmitted as electric currents to the "F. M. H. F. oscillator-transmitter-receiver."

The outgoing wave currents here are modulated by the reflected wave currents so as to provide a combined or resulting wave pattern containing a differential wave current having a frequency dependent on the difference in time required for a wave to travel out as an outgoing wave to the vehicle and back as a reflected wave. Assuming that the original waves are frequency modulated at a substantially constant rate over the desired range, then the frequency of the differential wave resulting from combination of the outgoing and reflected waves is substantially proportional to the distance of the vehicle from the wave director, providing that the distance of the wave director from the oscillator is negligible in relation to the distance to the vehicle.

The combination of the outgoing and reflected waves is connected to the "detector" where a rectified output is obtained characteristic of the differential frequency. This output is preferably carried through an automatic volume control amplifier designated "A. V. C. amplifier" and thence through a "frequency selective circuit" to an "indicator or relay," comprising an electrical network by means of which rate of change of frequency of the differential wave is converted to terms of vehicular speed for operation of indicator or relay apparatus, as later described.

The A. V. C. amplifier may be of conventional type, preferably for voltage amplification in a frequency range from 200 to 30,000 cycles for example, with one or more stages of amplification and an output stage. The automatic volume control factor in the amplifier is preferably only partially effective so that the output voltage is not closely controlled but is controlled within a desired operating range and extreme variations will be avoided.

The output of the A. V. C. amplifier is connected to one or more frequency selective circuits as desired. In Fig. 2 the amplifier output at wires 18, 20 is shown connected through the primary coil 21 of a pair of inductively coupled coils 21, 22. At 23, the primary 21 is connected to the ground. A capacitor 24 is connected across the primary 21.

The secondary 22 of the inductively coupled coils is connected in series to capacitor 25 and thence to the grid of amplifier tube 26. Resistor 27 connects to ground as shown. Tuning capacitor 28 is connected directly across the secondary 22.

The primary 21 of the coupled coils is tuned to the desired frequency selected as representative of the distance over which it is desired to establish a zone of detection so that the presence of a vehicle within said zone causes a differential frequency output which is passed by the A. V. C. amplifier and then by the turned coils 21, 22 to provide an output voltage which may be connected to the speed-evaluating network through the illustrated output power tube 26, the cathode of which is connected to ground through the resistor 27, having capacitor 29 shunted thereacross. The plate of tube 26 is connected to power, designated B+ through resistor 30.

It will be understood by those skilled in the art that the capacitor 24 may be made variable instead of or in addition to the variable inductance in the primary coil 21, and also the degree of inductive coupling of the coils 21, 22 can be adjusted by an adjustable spacing to vary the frequency selecting characteristic.

The range of frequency chosen corresponds to a range of distance for the zone established along the traffic lane. For example, a frequency range of 16,000 to 24,000 cycles may be selected as corresponding to a detection distance of 100 to 150 meters or approximately 320 to 480 feet, so that vehicles within this zone starting at about 480 feet from the wave director 17 and continuing to about 320 feet from the director would be within the "active" zone of detection. In such case the tuned circuits would be arranged for the band of frequency 16,000 to 24,000 cycles.

The selection of the most desirable band pass filter circuits for particular ranges as desired is a matter of design well known to those skilled in the art, successive stages of filter circuits being employed as desired to sharpen or broaden the frequency limits of any desired band of frequencies characteristic of the particular detection distance or zone.

In one preferred embodiment of the invention the following values may be employed and the operation of the detection apparatus will be more fully understood in a description using these values.

Assume that it is desired to detect vehicles at distance of about 320 feet from the intersection or control point at which the wave director is located. This distance is about 100 meters in the metric measuring system. Now assume that the hyper-frequency waves generated by the transmitter have a frequency of 3,000 megacycles. These waves act much like light waves and have a speed of the order of 300 million meters per second. Such outgoing waves will travel to any reflecting object such as a vehicle at 100 meters down the lane and 100 meters back, a total distance of 200 meters, in ⅔ of one millionth of a second.

Now using a frequency modulation swing of 40 megacycles total, that is from 2980 megacycles to 3020 megacycles, varying in a saw-tooth pattern and at a rate of 600 cycles per second, the change from minimum frequency of 2980 megacycles to maximum of 3020 megacycles occurs in one 600th of a second or at a rate of change of $40 \times 600 = 24{,}000$ megacycles per second. The reflected wave as received at the wave director will thus be $$\frac{2}{3{,}000{,}000} \times 24{,}000{,}000{,}000 = 16{,}000 \text{ cycles}$$

away from the outgoing wave and the combination of the two waves will create a beat note of 16,000 cycles per second at the detector.

This 16,000 cycle beat wave is thus characteristic of the distance of 100 meters, and a corresponding calculation for 200 meters will show that a 32,000 cycle beat wave will be obtained with the same assumed modulation. The average ratio of beat frequency to distance is thus 160 cycles per meter distance.

It is apparent, therefore, that the frequency varies in proportion to the distance of the reflecting vehicle from the transmitter-receiver, and that the rate of change of frequency is indicative of speed of vehicular travel.

The output from "driver" tube 26 is connected by conductors 31, 32 through blocking condenser 33 to a resistance-capacitance network comprising resistor 34 and condenser 35 shunted thereacross, and resistor 36 and shunted condenser 37. The respective resistors may be of 300,000 ohms, and capacitors 35, 37 may have values of .002 mfd. and .0005 mfd. respectively. At the lower connection of resistor 36 and capacitor 37, resistor 38, of the order of 100,000 ohms, connects to ground, as shown. Lead 39 connects to the cathode of rectifier tube 40.

The output from 26 is at constant voltage, although it will be understood that the frequency of the output is varying according to the approach or departure of the vehicle, as previously noted. Blocking condenser 33 removes any direct current voltage in the output from tube 26. The discharge from condenser 33 enters the selective resistor-capacitance network comprising resistances 34, 36 and therewith respectively associated capacitors 35, 37.

It is well known that the reactance in ohms of a condenser is inversely proportional to the frequency of the alternating current impressed thereon. It is apparent, therefore, that resistors 34, 36, and 38 constitute a voltage divider, and that the capacitors 35 and 37 oppose the passage of alternating currents in greater or less degree according to their capacities and the frequency of the currents. The capacitors therefore control the flow of current through resistors 34 and 36, and thus control the voltage in conductor 39. In other words, the resistor-capacity network, plus the resistor 38, comprise a voltage divider whose ratio is proportional to frequency over a predetermined frequency range.

The rate of change of distance of the reflecting vehicle from the transmitter-receiver—which is the speed of the vehicle—is manifested as rate of change of frequency, and therefore rate of change of voltage in conductor 39. The voltage is rectified by tube 40. Resistor 41 and capacitor 42 filter the output of tube 40.

A voltmeter 43 in the output of tube 40 may be calibrated in terms of distance, and will indicate the distance of reflecting object from the transmitter-receiver.

To analyze the rate of change of voltage and thus to evaluate the speed of the vehicle, there is employed a capacitor resistor combination comprising a .005 mfd. capacitor 44 and a 2 megohm resistor 45 in the grid circuit of vacuum tube 46.

If the vehicle is moving at relatively high speed the average voltage value applied to capacitor 44 will change relatively rapidly and more of this changing voltage will be applied to the grid of tube 46, whereas if the vehicle speed is relatively low, the smaller change of the average voltage value applied to capacitor 44 will result in said capacitor offering more impedance to current flow from this voltage, and thus a lower voltage value will be impressed in the grid.

The tube 46, which may be considered as a thermionic voltmeter, has the usual cathode and anode circuit, and a meter 47, or a voltage-sensitive relay, may be connected in the circuit between the plate or anode of tube 46 and a source of D. C. positive power 48, as shown. The plus potential of source 48 is higher than that serving potentiometer 51.

Desirably, an adjustable resistor 49 is in circuit with the meter or relay 47, as indicated. Resistance 50 bucks the plate voltage of tube 46 to set the zero of the meter 47. Potentiometer 51 is shunted across the meter 47 for calibration thereof.

Assuming that 47 comprises a volt meter graduated in terms of speed, the speed of the vehicle will be indicated by deflection of the meter to the right or left of a zero center position in accordance with the rate of change of the average voltage value amplified by the tube 46. The zero center position corresponds to a normal steady current value for no movement of a vehicle in the zone and is determined as desired by the grid bias and the plate voltage of tube 46. The direction of the vehicle toward or away from the transmitter-receiver station will be indicated by the deflection of the meter to one side or the other of the center position relatively, showing a decreasing or increasing differential frequency respectively in the vehicle detection circuit.

It has previously been noted that there is an immediate peak reaction as the vehicle comes into and departs from the zone of the high frequency waves. Hence, the meter 47 will have an exaggerated momentary swing upon entry of a vehicle into the high frequency wave zone, and another swing upon the vehicle's leaving the zone. The steady deflection of the meter between these exaggerated swings will indicate the speed in the zone.

In an attended traffic control station, where the attendant may discount the exaggerated momentary swings and base his reaction as to traffic control only on the steady deflection of the meter between swings the exaggerated peaks—which indicate false speeds—may be discounted. If a relay were employed instead of a meter, at 47—said relay being in circuit with traffic detection apparatus, speed signalling apparatus, or the like—it is obvious that the mechanical relay could not "disregard" these essentially false readings, but would immediately actuate its correlated control apparatus.

For example, it is conceivable that an installation on a highway is to flash a warning signal if vehicle speeds exceed 30 M. P. H., or are less than 20 M. P. H. The initial impulse of the vehicle entering the speed detection zone may result in a voltage value indicative of greater than the 30 M. P. H. speed even though the vehicle were proceeding at between 25 and 30 M. P. H. The resulting action of the signalling apparatus would therefore be false.

The present invention embodies means comprising a monitoring circuit subject to change in amplitude of beat frequency for cancelling out the peak signals which occur as the vehicle comes into and departs from the detection zone.

Conductor 52 in the output of vacuum tube 26 passes through capacitor 53 and thence divides into two rectifier circuits incorporating oppositely connected rectifier tubes 54, 55. It will be noted that branch circuit 56 is connected to the anode of tube 54, whereas branch 57 is connected to the cathode of tube 55. Cathode of tube 54, and anode of tube 55 are grounded through identical resistances 58 and 59 respectively.

Connected into the cathode circuit of tube 54, and to the anode circuit of tube 55 are capacitor-resistance networks represented by capacitor 60 and resistance 61, and capacitor 62 and resistance 63 respectively. Networks 60, 61 and 62, 63 correspond to the rate of change network comprising capacitor 44 and resistor 45, but work on a lower rate of change than said latter network. In advance of capacitors 60 and 62, a branch circuit leads to ground through the identical capacitors 64 and 65. From the capacitor resistance networks represented by 60, 61 and 62, 63 leads 66, 67 connect to the cathode of tubes 68, 70, respectively. The anodes of said tubes are grounded through appropriate resistances as shown. In series with each of the anode circuits of the said tubes 68, 70, is a capacitor 71, 72, respectively, each capacitor being of equal value, preferably .01 mfd. The respective circuits merge at conductor 73.

An amplifier 74 may be employed to increase the sensitivity of the rectifier circuits. Through leads 75, 76, the output of amplifier 74 connects to the grids of the locking tubes 77, 78. Each of said locking tubes affords a path to ground, in advance of tube 46, and when either of said tubes 77, 78 is conducting, no current flows to tube 40, and there is therefore no action of meter 47.

The threshold sensitivity of the rectifier circuit is controllable by means of a suitable source of C minus voltage, acting through a relatively large—say 5 megohm—resistor 79. The C minus voltage sets the grid bias on tubes 77, 78 until the bias is overcome by the output of the amplifier 74 in the rectifier circuit.

Condenser 53 of the rectifier circuit will have a charge impressed thereon if one rectifier tube is more effective than the other. A one megohm resistor 80 will stabilize the circuit and keep it from "floating."

The rectifier tubes 54 and 55 are subject to change of magnitude of voltage, and not to change of frequency. A surge of voltage, either of minus or plus value, occurring as the vehicle enters or leaves the detection zone, is manifested on the grids of the tubes 77 and 78.

Either of these tubes, depending upon the plus or minus value of the voltage in conductor 76, becomes conducting, and grounds the output from tube 40. There is no response of meter 47, therefore, until after the vehicle has entered the zone, and false meter readings are avoided.

In order to prevent a plus-voltage surge in conductor 75 from placing a plus charge on capacitor 44 due to the grid in tube 78, it is preferred to employ a rectifier tube 81 connected to conductor 75, as shown.

Control of the characteristics of the variable vacuum tubes in the automatic volume control "A. V. C.," and resultant control of the gain of the "A. V. C." may be accomplished by the negative output of the rectifier circuits by means of a conductor 82 connected between the output of tube 55 and the A. V. C., as shown in Fig. 2. It is therefore possible to obtain a relatively uniform general level of operation for variant conditions of reflection of the hyper-frequency wave.

Fig. 3 shows an organization of relays by means of which the voltages resulting from the reflection from a vehicle of the hyper-frequency waves may be utilized to actuate various indicators or signals as desired.

A polarized relay 90 is connected in parallel in the output circuit of tube 46. The voltage impressed upon the relay 90 is therefore proportional to the speed of the vehicle. Relay 90 has an armature 91 positioned between contacts 92, 93, normally in open-circuit position with respect to the said armature. The armature 91 is spring-biased (not shown) to give to the relay, a controlled "pull-in" corresponding to a predetermined speed. Actuation of the relay to close the circuit between armature 91 and contact 92 can therefore be made to result from an overspeed in one direction with respect to the control point, and correspondingly, the closing of the circuit between armature 91 and contact 93 will be effected upon an overspeed in the opposite direction. The leads from armature 91 and the respective contacts 92, 93, may be connected to any suitable signalling or other electrically actuated apparatus O. S., with lamp "A" indicating overspeed in "approach" direction, and lamp "D" indicating overspeed in "departure" direction. Gongs or other audible signal apparatus, or other electrical apparatus may be used in lieu of signal O. S. In some instances it may be desirable to actuate an overspeed regardless of direction of movement, and in such circumstance, the leads from contacts 92, 93, may be interconnected and a common lead taken therefrom for association with the armature lead to actuate such overspeed signalling device.

Polarized relay 94, also in parallel electrical circuit, may be a high sensitivity relay which will pull in for any vehicle movement detected in the traffic lane. The said relay has an armature 95 spaced between contacts 96, 97, and connection of the illustrated leads therefrom may be made to electrical apparatus V. M. D. which will indicate the movement of a vehicle in either "approach" or "departure" direction by the respective lamps or equivalent A or D.

A second armature 98 "ganged" to the armature 95 for actuation therewith is positioned between the respective interconnected contacts 99, 100, and the closing of a circuit between armature 98 and either of the contacts 99 or 100, can be made to actuate electrical apparatus V. M. which will indicate movement of the vehicle regardless of direction.

Polarized relay 101 has armatures 102, 103 spring-biased into normally closed contact with contacts 104, 105 respectively. This relay may be adjusted for a controlled "pull-in" for a voltage strength corresponding to a certain low speed in the respective approach and departure directions. Pull in of the relay will open the respective armature contact circuits. For speeds which are above the pre-established minimum, the armatures 102, 103 will be pulled out of contact with contacts 104, 105, respectively, and there will be no actuation of the signalling apparatus. Should a vehicle be moving at a rate below the predetermined minimum, the spring bias of the armature maintains connection with the respective contacts.

It will be noted that the armatures 102, 103 of relay 101 are in series with contacts 96, 97 re-respectively of relay 94. A lead 106 is common to the approach signal A and departure signal D of underspeed indicator U. S. If there is no movement of the detected vehicle, relay 94 will be non-operative and there exists an open circuit to the respective indicators of the underspeed indicator. When there is movement of the vehicle in either direction, the armature of relay 94 closes with contact 96 or 97 according to direction of movement, and the indicator U. S. is actuated if the vehicle speed is below the "pull-in" value of relay 101, and is not actuated for speeds greater than the "pull-in" speed.

To detect a parked, i. e., stationary, vehicle in the traffic lane, and to actuate a parked vehicle signal P. V., there are employed relays 107 and 110. It will be recalled that meter 43, in the output circuit of rectifier tube 40 indicates the distance from the control point of a reflecting vehicle. Obviously, said vehicle will reflect the hyper frequency radio wave regardless of whether the said vehicle is or is not in motion, and a voltage proportional to the beat frequency will appear in lead 39. Relay 107, designed to be sensitive to small voltage values, will pull in to close contact between its armature 108 and contact 109 as soon as a vehicle is detected within the detection zone.

Preferably, the relay 107 is of the vacuum tube type, although for simplification of showing, it has been conventionally represented.

Relay 110, which is in parallel with the output of tube 46 is non-polarized and its armature 111 is spring biased into closed circuit position with respect to contact 112. As appears from Fig. 3, contact 109 of relay 107 is electrically connected to armature 111 of relay 110. Leads from armature 108 of relay 107, and contact 112 of relay 110 connect to the parked vehicle signal P. V.

As above noted, relay 107 will "pull in" to close contact between armature 108 and contact 109, upon the detection of a vehicle in the detection zone. If the vehicle is stationary within the zone, there will be no output from tube 46 sufficient to energize the relay 110 to draw its armature 111 out of contact with contact 112 and there will therefore be a closed electrical circuit to signal P. V. On the other hand, if the vehicle is moving within the detection zone, the output from tube 46 will energize relay 110 to pull the armature 111 out of engagement with contact 112; the circuit to indicator P. V. will be open, and there will be no actuation of said indicator.

It is to be understood that in the circuit above described, the visual-indicator meter 47 may or may not be in the output of tube 46, as desired. It will be obvious to those skilled in the art that other relays and permutations and combinations of relays may be employed to actuate electrical devices signalling other vehicular conditions within the detection zone.

In the immediately foregoing description, it should be understood that the "zero" of the respective polarized relays corresponds to the zero of the voltmeter 47, as previously described.

When a vehicle is approaching the transmitter-receiver the voltage resulting from the changing beat frequency will be positive, with respect to the "zero" voltage of the relays, and said relays will operate, as above described, to indicate an approaching vehicle. Conversely, a departing vehicle will result in a sharp drop in voltage, the value of which will be less than the "zero" voltage of the respective relays, and will therefore be negative with respect thereto. Departure of the vehicle will then be indicated on the respective signalling apparatus.

Fig. 4 discloses the use of an unbalanced multivibrator circuit for deriving voltage proportional to frequency, replacing the resistance-capacitor combination previously described. The circuit is a modification of the familiar Eccles-Jordan trigger circuit. Triggering of the circuit results from the energy of the plus peaks of the beat frequency wave as the discharge of the respective condensers 200, 201 reduces the negative grid voltage of whichever of the triodes 202, 203 is at the moment nonconducting, and increases the grid voltage of the then conducting tube.

The triodes 202, 203 are preferably of the type commercially designated "6SN7." The grid of tube 202 is connected through condenser 200 to the plate of tube 203, and the grid of tube 203 is connected through condenser 201 to the plate of tube 202.

The plates of the respective tubes are respectively given a positive potential through the resistors 204, 205. The grid of tube 202 has a negative bias from a suitable negative potential source through a suitable potentiometer 206 and resistance 207. The grid of tube 203 has positive potential, applied through resistance 208.

The cathode of tube 202 leads to ground through a resistor 209, which may be 5000 ohms. Across said resistor is shunted capacitor 210, of .1 mfd. This resistor-capacitor combination in the cathode circuit places a voltage on the cathode which is proportional to the input voltage at conductor 31, and sets the operating point on the unbalanced multivibrator circuit so that it triggers only on the "plus" peaks of the incoming beat frequency wave.

The output from the multivibrator circuit of Fig. 4 is characterized by a square wave pattern for the plus surges only of the beat frequency. At low frequency, characteristic of low vehicular speed, the total value of generated voltage, per unit of time, is low. For greater vehicular speeds, the average voltage value per unit of time increases in that the multivibrator circuit "triggers" with increasing frequency. Thus, the voltage output of the multivibrator circuit is a function of frequency, and therefore, of vehicular speed.

As previously described with respect to the circuit of Fig. 2, the resistor-capacitor network embodying resistor 211 and capacitor 212 filters the output, and translates the output of the multivibrator into terms of voltage proportional to rate of change of frequency. The circuit enters capacitor 44 and thence passes into the circuit as shown in Fig. 2.

The voltmeter 43, calibrated in units of distance from the transmitter-receiver, may be included as shown.

Practical values for capacitors 200 and 201 may be .001 mfd. Capacitor 33 in the Fig. 4 circuit is .005 mfd. Resistor 204 can be 50,000 ohms; resistor 205, 50,000 ohms; and resistor 208, 200,000 ohms. Potentiometer 206 has 100,000 ohms maximum resistance, and resistor 207 may be 200,000 ohms.

Whereas it is obvious that the several objects of the invention as specifically afore noted are achieved, it is apparent that numerous changes in construction and rearrangements of the elements might be resorted to without departing from the spirit of the invention as defined by the claims.

I claim:

1. Means for analyzing a beat frequency resulting from the transmission of a linearly frequency modulated ultra high frequency radio wave along a pre-established lane and the beating against said transmitter wave of a portion of said wave reflected from a body in said lane to detect, by the value of the frequency of the beat frequency wave, the location of said body relative to the ultra high frequency transmitting-receiver station and by the rate of change of said frequency, the relative movement of said body: comprising a frequency-analyzing means into which said beat frequency wave is fed to derive a voltage proportional to the frequency thereof; said means comprising a thermionic multivibrator circuit adapted to trigger on the peaks of said beat frequency wave to afford an output characterized by a series of voltage pulses the number per unit of time of which is in direct proportion to the beat frequency wave, a voltmeter in the output of said frequency analyzing means to indicate, by its reading, the distance of said body from said station; a second frequency-analyzing network to derive a voltage proportional to rate of change of frequency of said beat frequency wave, and a thermionic voltmeter in the output of said second network to indicate by the reading thereof, the rate of movement of said body relative to said transmitting-receiving station.

2. Means for analyzing the value and direction of change of the frequency of a beat frequency wave resulting from beating against an ultra-high-frequency radio wave, a portion of said wave reflected by a body in the path of said wave: comprising means for deriving a voltage proportional to said frequency of said beat frequency wave, means for deriving a voltage proportional to the rate of change of said frequency, a thermionic voltmeter circuit in the output of said last-named means, a visual indicating voltmeter in said voltmeter circuit, and means in said voltmeter circuit for establishing a zero for said voltmeter representing zero polarity of said beat frequency wave whereby a lessening or an increasing frequency of said beat frequency wave and the rate of change of said frequency may be visually indicated by the relative deflection of said voltmeter from the zero thereof.

3. Means as in claim 2, wherein a polarized relay is connected into the output of said voltmeter; said relay being adapted to operate signalling means remote from said voltmeter to indicate the direction of change of said beat frequency wave.

4. Apparatus for detecting the presence and motion of a vehicle within a zone of preestablished length in a traffic lane, including means for transmitting along said zone an ultra high frequency radio wave modulated over a preestablished frequency range and means for receiving and beating the portion of the radio wave reflected from said vehicle against the said modulated transmitted wave to derive an alternating current beat frequency wave the frequency of which is a function of the distance of the vehicle within said zone from the transmitter-receiving means and the increase or decrease of frequency of said beat frequency wave is representative of the direction of movement of the vehicle in said preestablished zone relative to the transmitter-receiver: means for obtaining a voltage the value of which is proportional to the rate of change of frequency of said beat frequency wave and the polarity of which results from the respective increase or decrease of said frequency; and a meter responsive to the value and polarity of said voltage for thereby indicating the speed of movement and direction of movement of said vehicle within said zone.

5. In apparatus for detecting the presence and motion of a vehicle in a traffic lane, including means for transmitting an ultra high frequency radio wave along said traffic lane, said wave being linearly frequency modulated over a preestablished range, and means for receiving and beating the portion of said wave reflected from a vehicle in said traffic lane against said transmitted wave to obtain a beat frequency wave: means for amplifying the voltage of said beat frequency wave; means for rectifying said voltage; an electrical network into which said amplified rectified voltage is fed to derive a voltage proportional to rate of change of frequency of said beat frequency wave as the vehicle moves relative to the transmitting and receiving means; a polarized meter in the output of said network responsive to the voltage thereof; and means for establishing a zero polarity value for said meter representing a stationary vehicle within said traffic lane the point of demarcation between voltages derived from respectively increasing or decreasing frequencies, whereby the voltage value and the polarity of output of said network is indicated by departure of said meter from its said zero point will represent the rate and direction of movement of the vehicle relative to the transmitter-receiver station.

6. Apparatus for determining the rate of movement of a vehicle within a pre-established zone in a traffic lane, comprising means for creating a beat frequency wave by transmitting along said zone in the direction of said vehicle, a linearly frequency modulated ultra high frequency radio wave and means for receiving the portion of said wave reflected from said vehicle and beating said reflected wave against the transmitted wave to derive a beat frequency wave; means for selecting an overall range of beat frequency corresponding to the respective beat frequencies resulting from wave reflection at the limits of said zone; a frequency responsive electrical network in the output of said frequency selective means for deriving a voltage proportional to the frequency of said beat frequency wave; and means for deriving from the rate of change of frequency of said wave, a voltage of one polarity for a vehicle approaching the transmitter-receiver and of a different polarity for a vehicle departing from said transmitter receiver.

7. In apparatus for detecting the presence of a vehicle in a delimited zone in a traffic lane and for determining the speed and direction of movement of said vehicle therein by evaluating the voltage of a beat frequency wave derived from transmitting along said zone a linearly frequency modulated ultra high frequency radio wave and receiving and beating against said transmitted wave, the portion of the wave reflected from a vehicle in said zone: means for transmitting along said zone an ultra high frequency radio wave modulated over a preestablished frequency range and means for receiving and beating the portion of the radio wave reflected from said vehicle against the said modulated transmitted wave, means for selecting an overall range of beat frequency corresponding to the respective beat frequencies resulting from wave reflection at the limits of said zone; a frequency-responsive electrical network in the output of said frequency selective means for deriving a voltage proportional to the frequency of said beat frequency wave; a second frequency responsive electrical network for deriving a voltage value proportional to rate of change of frequency of said wave and having a polarity determined by the increase or decrease of said frequency; means for establishing a zero polarity representing absence of change of frequency of the frequency of said beat frequency wave; and means in the output of said second-named network for indicating the value and polarity of the voltage output of said second frequency responsive network, said means being arranged to tangibly express said value and polarity in a manner indicative of the speed and direction of movement of the vehicle.

8. Apparatus as in claim 7, wherein the means in the output of said second-named frequency responsive network includes relay means responsive to an increasing value of voltage the lower limit of which corresponds to a predetermined lower limit of speed of the vehicle, and signalling means served by said relay to indicate that said vehicle is moving at or above said lower limit of speed.

9. Apparatus as in claim 7, wherein the means in the output of said second-named frequency responsive network includes relay means responsive to an increasing value of voltage the lower limit of which corresponds to a predetermined lower limit of speed of the vehicle and responsive to a selected polarity of said voltage, and signalling means served by said relay to indicate that said vehicle is moving at or above said lower limit of speed and in a direction corresponding to the said polarity.

10. Apparatus as in claim 7, wherein the means in the output of said second-named frequency-responsive network includes polarized relay means responsive to a range of voltage whose lower limit corresponds to a predetermined lower limit of speed of the vehicle and to a relative polarity of voltage corresponding to approach or departure of the vehicle within said zone, and multiple signalling means served by said relay to indicate that said vehicle is moving, in an approach or departure direction relative to the ultra high frequency transmitter-receiver, at or above said lower limit of speed.

11. Apparatus as in claim 7, wherein the means in the output of said second-named frequency responsive network includes relay means responsive to a value of voltage output of said network indicative of movement of said vehicle within said zone at any speed at or above a predetermined lower limit of speed.

12. Apparatus as in claim 7, wherein the means in the output of said second-named frequency responsive network includes relay means responsive to a value and polarity of voltage output of said network indicative of direction of movement of said vehicle within said zone at any speed at or above a predetermined lower limit of speed.

13. Apparatus as in claim 7, wherein the means in the output of said second-named frequency responsive network includes polarized relay means responsive to a value of voltage output of said network indicative of movement of said vehicle within said zone at any speed above a predetermined lower limit of speed and to the polarity of said voltage to indicate approach or departure of said vehicle relative to the ultra high frequency transmitter-receiver.

14. Apparatus as in claim 7, wherein the means in the output of said second-named frequency responsive network includes polarized relay means responsive to a range of voltage of said output whose upper limit corresponds to a speed of vehicular movement at a pre-established maximum speed, and signalling means in said relay circuit to tangibly indicate speed of vehicular movement at or below such maximum speed and the direction of movement of said vehicle.

15. Apparatus as in claim 7, including relay means in the output of said first-named frequency responsive network and energized by the voltage output thereof; and signal means in circuit with said relay means and actuated thereby to indicate the presence of a vehicle in said zone.

16. Apparatus for the detection of movement, within a delimited zone, of a body having wave-reflective properties, by evaluating the beat frequency derived from a linearly modulated ultra high frequency wave projected against said body in its path of movement within said zone and beating the reflected portion of said wave against said transmitted wave: comprising *means for* filtering said beat frequency to derive a range of beat frequency comprehending the respective beat frequencies corresponding to wave reflections from the respective limits of said zone; *means including* [passing said beat frequency wave into] a frequency responsive electrical network to derive *from said beat frequency range wave* a voltage proportional to the frequency of said wave; *means for* [amplifying and] rectifying the output of said network, *means including* [and passing said amplified and rectified output into] a second frequency responsive network to derive *from said rectified output* a voltage responsive to rate of change of frequency of said wave; *means for indicating movement of said body according to voltage value input;* means responsive to the voltage output of said second-named network to actuate *said indicating* means [for indicating movement of said body according to the voltage value of the output of said second-named network]; and means *responsive to sudden large increase and decrease in amplitude of such beat frequency range wave accompanying entry and departure of the body into and from said zone respectively* for by-passing in advance of said indicating means, the voltage corresponding to the *apparent* peak rate of change of the frequency of the beat frequency *range* wave resulting as the body enters and leaves said zone, whereby said indicator means will not be actuated by such last-named voltage.

17. Apparatus as in claim 16 wherein the voltage by-passing means comprises a rectifying system connected to said first beat frequency responsive means and including vacuum tubes connected into the output of said second-named frequency responsive network and individually rendered conductive to ground in advance of said indicator means according to whether a positive or negative voltage results from the peak change of the amplitude of the said beat frequency *range* wave.

18. Apparatus as in claim 16, wherein the voltage by-passing means comprises a rectifying system shunted across said second-named frequency-responsive network and including vacuum tubes respectively reversely connected into the output of said second-named frequency responsive network and individually rendered conductive to ground in advance of said indicator means according to whether a positive or negative voltage resulting from *the peak changes in amplitude corresponding to* said peak beat frequencies is impressed upon the respective vacuum tubes, to provide a path to ground for the voltages derived from said peak beat frequencies.

19. Apparatus for detection of presence and direction of movement of vehicular traffic within a preestablished zone in a traffic lane, comprising means for transmitting modulated ultra high frequency waves along said traffic lane and for receiving a portion of said wave reflected from a vehicle in said zone and for beating said reflected wave against said transmitted wave for obtaining a beat frequency wave; means for deriving a direct current output voltage indicative of the rate of change of frequency of said beat frequency wave; means for identifying the polarity of said voltage as represented by whether the frequency of said beat frequency wave is increasing or decreasing corresponding to direction of movement of said vehicle; polarized relay means operated by said derived voltage; and a work circuit controlled by said relay means.

20. Apparatus for detection of presence and direction of movement of vehicular traffic within a preestablished zone in a traffic lane, comprising means for transmitting modulated ultra high frequency waves along said traffic lane and for receiving a portion of said wave reflected from a vehicle in said zone and for beating said reflected wave against said transmitted wave for obtaining a beat frequency wave; means for deriving a direct current output voltage indicative of the rate of change of frequency of said beat frequency wave; relay means operative only by a predetermined polarity of said output voltage corresponding to one direction of movement of said vehicle; and a work circuit controlled by said relay means.

21. Means for analyzing a beat frequency resulting from the transmission of a linearly frequency modulated ultra high frequency radio wave along a pre-established lane and the beating against said transmitted wave of a portion of said wave reflected from a body in said lane to detect, by the value of the frequency of the beat frequency wave, the location of said body relative to the ultra high frequency transmitting-receiver station and by the rate of change of said frequency, the relative movement of said body: comprising a frequency-analyzing means into which said beat frequency wave is fed to derive a voltage proportional to the frequency thereof, said means comprising a pair of thermionic tubes arranged in an unbalanced multivibrator circuit the triggering voltage thereof being provided by the beat frequency wave; the cathode of the first tube of the pair being connected to ground through a resistor and thereacross shunted capacitor having respective values such that the cathode voltage of said tube is proportional to the beat frequency voltage; a voltmeter in the output of said frequency analyzing means to indicate, by its reading, the distance of said body from said station; a second frequency-analyzing means whereby to derive a voltage proportional to rate of change of frequency of said beat frequency wave, and a voltmeter in the output of said second means to indicate by the reading thereof, the rate of movement of said body relative to said transmitting-receiving station.

22. Apparatus for detecting the presence and movement of vehicles within a predetermined area in a traffic lane, comprising means for transmitting along said area an ultra high frequency radio wave modulated over a preestablished frequency range and means for receiving and beating the portion of the radio wave reflected from a vehicle against the modulated transmitted wave to derive an alternating current beat frequency wave the frequency of which is a function of the distance of the vehicle within said area from the transmitter-receiver means and the increase or decrease of frequency of said beat frequency wave is representative of the direction of movement of the vehicle with respect to said transmitter-receiver; means for deriving a voltage proportional to the frequency of the beat frequency wave; means for obtaining a voltage proportional to the rate of change of frequency of the beat frequency wave; a signal for indicating the presence of a vehicle in said area; and an electric circuit for actuating said signal only if said vehicle is stationary, comprising a relay energized by the voltage output of said first-named voltage deriving means and adapted to close a normally open switch in said signal circuit upon energization of said relay and a second relay energized by said second-named voltage deriving means and adapted to open a normally closed switch in said signal circuit upon energization of said relay; whereby if both of said relays are energized the said signal will not operate but if only the first relay is energized the signal will operate.

23. *Apparatus for the detection of movement, within a delimited zone, of a body having wave-reflective properties, by evaluating the beat frequency derived from a linearly modulated ultra high frequency wave projected against said body in its path of movement within said zone and beating the reflected portion of said wave against said transmitted wave: comprising means for filtering said beat frequency to derive a range of beat frequency comprehending the respective beat frequencies corresponding to wave reflections from the respective limits of said zone; means for amplifying said beat frequency range wave; means including a frequency responsive electrical network to derive from said beat frequency range wave a voltage proportional to the frequency of said wave; means for rectifying the output of said network, means including a second frequency responsive network to derive from said rectified output a voltage responsive to rate of change of frequency of said wave; means for indicating movement of said body according to voltage value input; means responsive to the voltage output of said second-named network to actuate said indicating means; and means responsive to sudden large increase and decrease in amplitude of such beat frequency range wave accompanying entry and departure of the body into and from said zone respectively for by-passing in advance of said indicating means, the voltage corresponding to the apparent peak rate of change of the frequency of the beat frequency range wave resulting as the body enters and leaves said zone, whereby said indicator means will not be actuated by such last-named voltage.*

*24. Apparatus for the detection of movement, within a delimited zone, of a body having wave-reflective properties, by evaluating the beat frequency derived from a linearly modulated ultra high frequency wave projected against said body in its path of movement within said zone and beating the reflected portion of said wave against said transmitted wave: comprising means for filtering said beat frequency to derive a range of beat frequency comprehending the respective beat frequencies corresponding to wave reflections from the respective limits of said zone; means for deriving from said beat frequency range wave a voltage proportional to the frequency of said wave, means for deriving from said voltage a further voltage responsive to rate of change of frequency of said wave; means for indicating movement of said body according to voltage value input; and means responsive to said further voltage to actuate said indicating means; and means responsive to sudden large increase and decrease in amplitude of such beat frequency range wave accompanying entry and departure of the body into and from said zone respectively for by-passing in advance of said indicating means, the voltage corresponding to the apparent peak rate of change of the frequency of the beat frequency range wave resulting as the body enters and leaves said zone, whereby said indicator means will not be actuated by such last-named voltage.*

*25. Apparatus for the detection of movement, within a delimited zone, of a body having wave-reflective properties, by evaluating the beat frequency derived from a linearly modulated ultra high frequency wave projected against said body in its path of movement within said zone and beating the reflected portion of said wave against said transmitted wave: comprising means for filtering said beat frequency to derive a range of beat frequency comprehending the respective beat frequencies corresponding to wave reflection from the respective limits of said zone; means for deriving from said beat frequency range wave a voltage proportional to the frequency of said wave, means for deriving from said voltage a further voltage responsive to rate of change of frequency of said wave; means for indicating movement of said body according to voltage value input; means responsive to said further voltage to actuate said indicating means; grid controlled electronic tube means connected between ground and the output of said further voltage deriving means at a point between said output and said indicating means for shunting said further voltage to ground and away from said indicating means when said grid controlled electronic tube means is rendered conducting, and two oppositely conducting rectifying networks connected to the input of the first frequency proportional voltage deriving means to derive voltage pulses of opposite polarity in response to sudden large changes in amplitude of said beat frequency range wave applied thereto corresponding to sudden changes in such frequency proportional voltage as said body enters and leaves said zone respectively; and means controlled by the last named voltage pulses from such networks to actuate said grid controlled electronic tube means to render the latter conducting to ground during and in response to such voltage pulses, whereby said indicator means will not be actuated by voltage pulses corresponding to the apparent peak rate of change of frequency of the beat frequency range wave resulting as the body enters and leaves said zone.*

*26. Apparatus as in claim 25, in which said grid controlled electronic tube means includes tubes having anode-cathode circuits oppositely connected between said output and ground and having grids connected in common, and means normally biasing said grids to render said tubes non-conducting; and in which said rectifier networks comprise rectifier and series resistance circuits connected in parallel between the input of said first voltage deriving means and ground with such circuits oppositely polarized, and a shunt capacitor across the output of each of said rectifiers and a series capacitor and resistance across the output of each of said rectifiers with another rectifier and resistor across the last named resistance, to derive positive and negative voltage values respectively from the respective rectifier circuits dependent upon such sudden large changes in amplitude of said beat frequency range wave corresponding to peak rate of change of the voltage output of said first voltage deriving means, and series capacitors in the outputs of the respective last named rectifier-resistor circuits to differentiate such output to provide control output voltage pulses for very rapid changes in the last named voltage values characteristic of a body entering and leaving said zone respectively, and means for applying such last named voltage pulses to the control grids of said grid controlled electronic tubes to reduce momentarily their grid bias to render such tubes conducting to by-pass to ground said further voltage output during such peak voltage pulses.*

JOHN L. BARKER.

REFERENCES CITED

The following references are of record in the file of this patent or the original patent:

UNITED STATES PATENTS

| Number | Name | Date |
|---|---|---|
| 2,188,293 | Williams | Jan. 23, 1940 |
| 2,206,896 | Higgins | July 9, 1940 |
| 2,232,858 | Lane | Feb. 25, 1941 |
| 2,268,587 | Guanella | Jan. 6, 1942 |
| 2,301,929 | Budenbom | Nov. 17, 1942 |
| 2,337,328 | Hathaway | Dec. 21, 1943 |
| 2,362,503 | Scott | Nov. 14, 1944 |
| 2,402,464 | Suter | June 18, 1946 |
| 2,403,755 | Rankin | July 9, 1946 |
| 2,409,560 | Haight | Oct. 15, 1946 |
| 2,453,169 | Varian | Nov. 9, 1948 |
| 2,454,673 | Sanders | Nov. 23, 1948 |
| 2,467,455 | Aurell | Apr. 19, 1949 |
| 2,485,583 | Ginzton | Oct. 25, 1949 |